United States Patent
Bai

(10) Patent No.: US 11,277,165 B2
(45) Date of Patent: Mar. 15, 2022

(54) RADIO FREQUENCY FRONT-END TRANSMISSION MODULE, CHIP, AND COMMUNICATIONS TERMINAL

(71) Applicant: Yunfang Bai, Tianjin (CN)

(72) Inventor: Yunfang Bai, Tianjin (CN)

(73) Assignee: VANCHIP (TIANJIN) TECHNOLOGY CO., LTD., Tianjin (CN)

(*) Notice: Subject to any disclaimer, the term of this patent is extended or adjusted under 35 U.S.C. 154(b) by 0 days.

(21) Appl. No.: 17/106,082

(22) Filed: Nov. 28, 2020

(65) Prior Publication Data

US 2021/0083714 A1    Mar. 18, 2021

Related U.S. Application Data

(63) Continuation-in-part of application No. 16/313,120, filed as application No. PCT/CN2017/089836 on Jun. 23, 2017, now abandoned.

(51) Int. Cl.

| H04B 1/40 | (2015.01) |
| H04B 1/04 | (2006.01) |
| H04B 1/401 | (2015.01) |
| H04B 1/00 | (2006.01) |
| H04B 1/44 | (2006.01) |

(52) U.S. Cl.
CPC ......... *H04B 1/401* (2013.01); *H04B 1/0067* (2013.01); *H04B 1/0483* (2013.01); *H04B 1/44* (2013.01); *H04B 1/006* (2013.01)

(58) Field of Classification Search
CPC ...... H04B 1/04; H04B 1/0483; H04B 1/0067; H04B 1/40; H04B 1/401; H04B 1/44; H04B 1/005; H04B 1/006
See application file for complete search history.

(56) References Cited

U.S. PATENT DOCUMENTS

| 8,831,544 | B2* | 9/2014 | Walker | H03F 3/245 455/127.1 |
| 2010/0248660 | A1* | 9/2010 | Bavisi | H04B 1/0458 455/120 |
| 2015/0133067 | A1* | 5/2015 | Chang | H04B 1/006 455/78 |
| 2015/0303971 | A1* | 10/2015 | Reisner | H01L 25/0657 455/77 |
| 2017/0093442 | A1* | 3/2017 | Jayaraman | H04B 1/0057 |
| 2017/0288724 | A1* | 10/2017 | Kamgaing | H03H 7/38 |
| 2018/0248569 | A1* | 8/2018 | Takenaka | H04B 1/50 |

* cited by examiner

*Primary Examiner* — Blane J Jackson
(74) *Attorney, Agent, or Firm* — George Guosheng Wang; United States Research and Patent Firm

(57) ABSTRACT

Disclosed in the present invention are a radio frequency front-end transmission module, a chip, and a communications terminal. In the radio frequency front-end transmission method, an output matching circuit of at least one transmission channel is connected to a switch unit, and is connected to a radio frequency transmission path by using the switch unit; an output matching circuit of another at least one transmission channel is directly connected to the radio frequency transmission path. By means of the present invention, a matched transmission channel can be selected according to different frequency bands in different modes, and a control unit controls on and off of a corresponding amplification unit and the switch unit, to implement output of radio frequency signals of different frequency bands in different modes.

10 Claims, 4 Drawing Sheets

RADIO FREQUENCY FRONT-END TRANSMISSION MODULE, CHIP, AND COMMUNICATIONS TERMINAL

BACKGROUND

Technical Field

The present invention relates to a radio frequency front-end transmission module, also relates to an integrated circuit chip and a communications terminal that use the radio frequency front-end transmission module, and belongs to the field of wireless communications technologies.

Related Art

With constant progress of global technologies, mobile communications technologies gradually evolve from 2G to 3G, and then to a 5G era. Currently, the quantity of 5G frequency bands is relatively large, and distribution is relatively scattered. Frequency bands and modes used by various mobile communications technologies are different. Manufacturers manufacturing new generation mobile communications devices need to design a radio frequency front-end module capable of using a plurality of frequency bands and modes.

US 2015/0303971 discloses an example HBT PA die configured for 3G/4G operations having multiple PAs configured for combinations of frequency bands in FDD and TDD LTE modes coupled to an output match circuit and radio frequency output switch for selection of a channel in a broadband channel and omitting the radio frequency output switch for narrowband channels US 2015/0133067 discloses a front end design to support LTE carrier aggregation and an antenna switch system provide switching functionality between a high band and low band antennas from a number of frequency band channels.

SUMMARY

A first technical problem to be resolved by the present invention is to provide a radio frequency front-end transmission module.

Another technical problem to be resolved by the present invention is to provide an integrated circuit chip using the radio frequency front-end transmission module and a corresponding communications terminal.

To achieve the foregoing inventive objectives, the following technical solutions are used in the present invention:

According to a first aspect of the embodiments of the present invention, a radio frequency front-end transmission module is provided. The module comprises a switch unit and at least two transmission channels, wherein:

an output matching circuit of at least one transmission channel is connected to the switch unit, and is connected to a radio frequency transmission path by using the switch unit; and an output matching circuit of another at least one transmission channel is directly connected to the radio frequency transmission path;

each transmission channel includes an amplification unit, at least one of the amplification units being common to different transmission channels.

Preferably, the radio frequency front-end transmission module further comprises a control unit, and the switch unit and amplification units in the transmission channels are controlled by the control unit.

Preferably, the control unit controls, according to different requirements of inputting a radio frequency signal, a transmission channel matching the radio frequency signal to be in an on state, and controls all of remaining transmission channels to be in an off state.

Preferably, the at least one transmission channel is used for broadband communication, and the another at least one transmission channel is used for narrowband communication.

Preferably, the transmission channel used for broadband communication comprises a first amplification unit, a first output matching circuit, and a first switch unit, and an output end of the amplification unit is connected to the first switch unit by using the first output matching circuit.

Preferably, the first switch unit comprises at least one common end, and one common end is connected to the first output matching circuit.

Preferably, an output end of the first switch unit is connected to a plurality of corresponding radio frequency transmission paths.

Preferably, an output end of the first switch unit is connected to a plurality of corresponding radio frequency receiving paths.

Preferably, the transmission channel used for narrowband communication comprises a second amplification unit and a second output matching circuit, and an output end of the second amplification unit is connected to the second output matching circuit.

Preferably, the control unit is connected to an amplification unit in each transmission channel, and controls the amplification unit to be in an on or off state.

Preferably, an input end of the amplification unit in the transmission channel is connected to a same input matching circuit or a plurality of corresponding input matching circuits.

Preferably, the same input matching circuit is connected to a second switch unit or at least one radio frequency signal input end.

Preferably, an input end of the second switch unit is connected to a plurality of corresponding radio frequency signal input ends.

Preferably, the control unit is connected to the first switch unit and the second switch unit, the first switch unit and the second switch unit are controlled by using the control unit to be in the on or off state, the control unit controls the first switch unit to select a corresponding radio frequency transmission path to transmit a radio frequency signal, and the control unit further controls the second switch unit to select a corresponding radio frequency signal input end to receive the radio frequency signal.

Preferably, the amplification unit consists of one or more stages of amplification circuits, and two neighboring stages of amplification circuits are connected by using an interstage matching circuit.

According to a second aspect of the embodiments of the present invention, an integrated circuit chip is provided. The integrated circuit chip comprises the foregoing radio frequency front-end transmission module.

According to a third aspect of the embodiments of the present invention, a communications terminal is provided. The communications terminal comprises the foregoing radio frequency front-end transmission module.

By means of the radio frequency front-end transmission module provided in the present invention, a matched transmission channel can be selected according to different frequency bands in different modes, and the control unit controls on and off of corresponding amplification units and switch units, to implement output of radio frequency signals of the different frequency bands in the different modes, so as to improve operating efficiency of the radio frequency front-end transmission module, and reduce consumption of the radio frequency signals on the transmission channels.

DETAILED DESCRIPTION

The following further describes technical content of the present invention in detail with reference to the accompanying drawings and specific embodiments.

First it should be noted that a communications terminal in embodiments of the present invention refers to a computer device that can be used in a mobile environment and that supports a plurality of communications standards such as GSM, EDGE, TD_SCDMA, TDD_LTE, and FDD_LTE, and includes a mobile phone, a notebook computer, a tablet computer, an in-vehicle computer, or the like.

Figure 1:
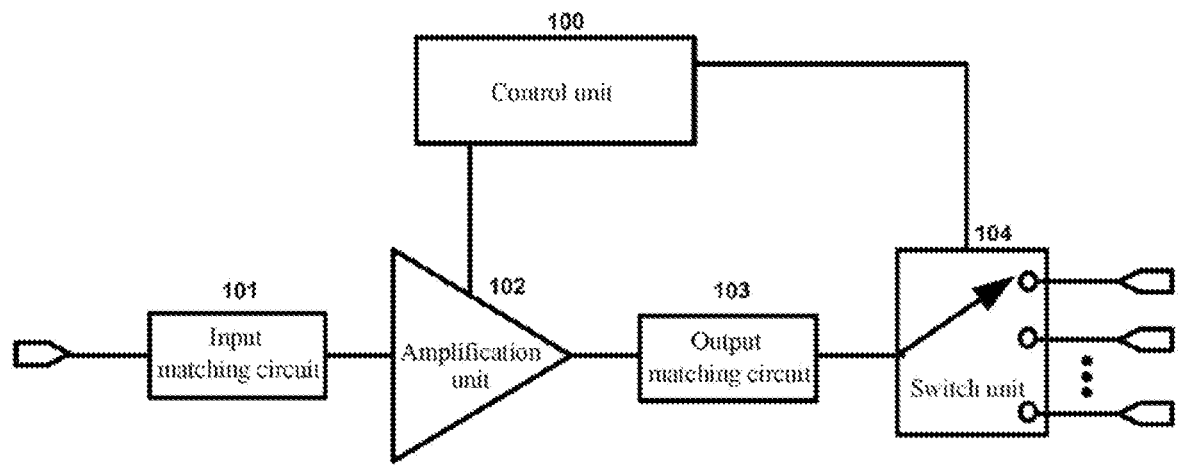
FIG. 1 is a block diagram of a principle of a multimode-multiband front-end module in the prior art.

FIG. 1 is a block diagram of a principle of an existing multimode-multiband front-end module. As shown in FIG. 1, the multimode-multiband front-end module includes an input matching circuit 101, an amplification unit 102, an output matching circuit 103, a switch unit 104, and a control unit 100. The input matching circuit 101 is disposed between a radio frequency signal input end and an input end of the amplification unit 102. The output matching circuit 103 is disposed between an output end of the amplification unit 102 and a common connection end of the switch unit 104. An output end of the switch unit 104 is connected to a plurality of radio frequency transmission paths. The control unit 100 is connected to the amplification unit 102 and the switch unit 104. The control unit 100 is configured to control the amplification unit 102 and the switch unit 104. For example, the control unit 100 may provide a source voltage or a bias voltage for the amplification unit 102.

In the present invention, the amplification unit consists of one or more stages of amplification circuits, and two neighboring stages of amplification circuits are connected by using an inter-stage matching circuit. During actual application, the amplification unit 102 is usually designed to be a wide-band amplifier on a specified frequency band. For example, the wide-band amplifier covers frequency bands within a range of 2300 MHz to 2700 MHz. The frequency range includes a plurality of frequency bands in TDD_LTE (time division duplex) mode. The plurality of frequency bands is respectively a B40 frequency band (2300 MHz to 2400 MHz), a B41 frequency band (2496 MHz to 2690 MHz), and a B38 frequency band (2570 MHz to 2620 MHz) of TDD_LTE, and further includes a B7 frequency band (2496 MHz to 2570 MHz) in FDD_LTE (frequency division duplex) mode. The input matching circuit 101 and the output matching circuit 103 are designed to be within a frequency range corresponding to the amplification unit 102. To achieve a requirement of broadband, a Q (quality factor) value of the output matching circuit cannot be excessively large. Consequently consumption of a radio frequency signal is relatively large after the radio frequency signal passes through the output matching circuit 103. On the other hand, performance of an amplification unit in a broadband environment is poorer than that of an amplification unit in a narrowband environment, the switch unit causes consumption of the radio frequency signal, and with an increase of a frequency, a more prominent parasitic effect indicates a higher caused consumption. These factors affect output power, efficiency, and linearity of a multimode-multiband front-end apparatus. For example, when operating on the B7 frequency band (2496 MHz to 2570 MHz) in FDD_LTE (frequency division duplex) mode, an operating current of the multimode-multiband front-end apparatus apparently increases, heat generation is correspondingly severe, and the linearity and the output power apparently deteriorate.

Therefore, the present invention first provides a radio frequency front-end transmission method, applied to a radio frequency front-end transmission module comprising a switch unit and at least two transmission channels, and comprising the following steps: connecting an output matching circuit of at least one transmission channel to the switch unit, and connecting the output matching circuit to a radio frequency transmission path by using the switch unit; and directly connecting an output matching circuit of another at least one transmission channel to the radio frequency transmission path. Preferably, a control unit controls, according to different requirements of inputting a radio frequency signal, a transmission channel matching the radio frequency signal to be in an on state, and controls all of remaining transmission channels to be in an off state. Herein, the at least one transmission channel is used for broadband communication, and the another at least one transmission channel is used for narrowband communication. Some technical details of the radio frequency front-end transmission method are further described hereinafter with reference to a corresponding radio frequency front-end transmission module.

Figure 2:
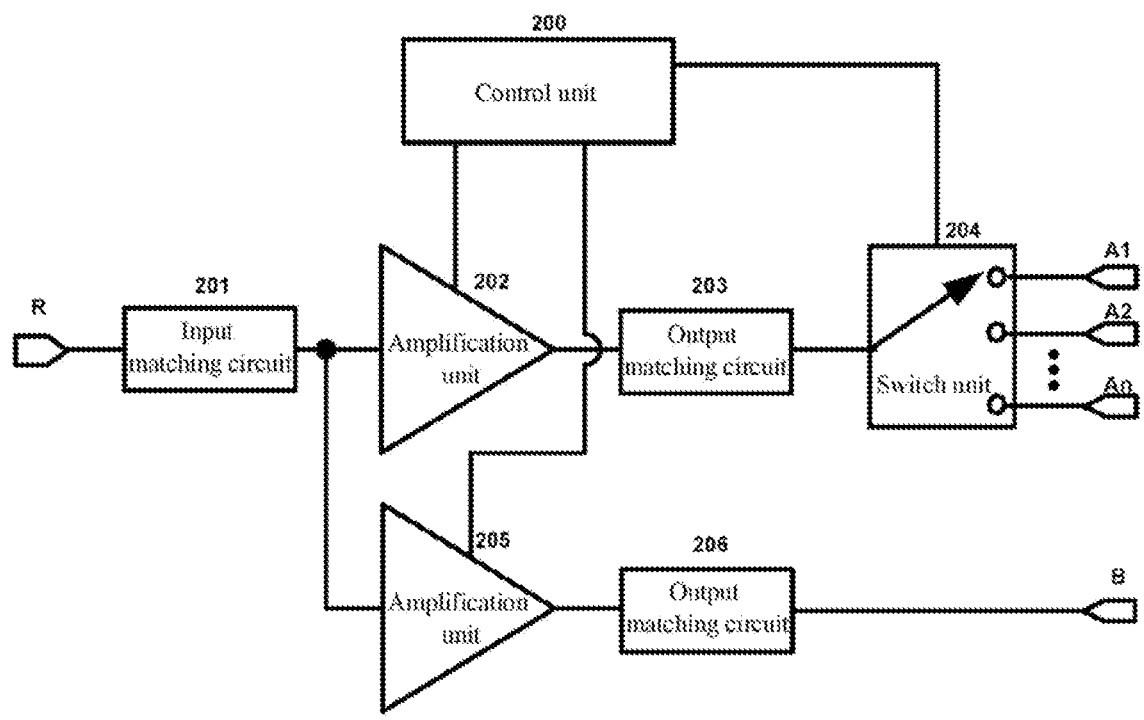
FIG. 2 is a block diagram of a principle of a radio frequency front-end transmission module according to Embodiment 1 of the present invention.

Next, a radio frequency front-end transmission module is provided in Embodiment 1 provided in the present invention. As shown in FIG. 2, the radio frequency front-end transmission module includes an input matching circuit 201, a first amplification unit 202, a second amplification unit 205, a first output matching circuit 203, a second output matching circuit 206, a switch unit 204, and a control unit 200. A radio frequency signal input end R is connected to input ends of the first amplification unit 202 and the second amplification unit 205 by using the input matching circuit 201. The first output matching circuit 203 is disposed between an output end of the first amplification unit 202 and a common connection end of the switch unit 204. An output end of the switch unit 204 is connected to a plurality of radio frequency transmission paths (A1 to An) n herein represents a positive integer, similarly hereinafter. The second output matching circuit 206 is disposed between an output end of the second amplification unit 205 and a radio frequency transmission path B. The control unit 200 is connected to the first amplification unit 202, the second amplification unit 205, and the switch unit 204. The switch unit 204 does not exist between the radio frequency signal input end R and the radio frequency transmission path B Therefore, consumption of the transmission channel is apparently less than that of a transmission channel from the radio frequency signal input end R to the radio frequency transmission paths (A1 to An). On the other hand, the second output matching circuit 206 may be designed to be a narrowband output matching circuit (where at least one Q value is quite large in the circuit) according to a requirement, and a Q (quality factor) value may be improved, thereby reducing consumption of a transmission channel on which the second output matching circuit is located. In addition, the second amplification unit 205 may be optimized to be within a specified narrowband frequency band range, thereby improving performance of a transmission channel on which the second amplification unit 205 is located.

The following still uses the frequency bands within the range of 2300 MHz to 2700 MHz as an example to further describe the radio frequency front-end transmission module provided in Embodiment 1. An uplink and a downlink in FDD_LTE mode are simultaneously performed on different frequency bands, an operating current is relatively large, and a requirement for a spectrum resource is relatively high. Therefore, a radio frequency signal on a B7 frequency band (2496 MHz to 2570 MHz) in FDD_LTE mode may select to enter the input matching circuit 201 from the radio frequency signal input end R. The second amplification unit 205 is controlled, by using the control unit 200, to enter an operating state. The radio frequency signal enters the second amplification unit 205 by using the input matching circuit 201 for amplification. The amplified radio frequency signal is then transmitted to the radio frequency transmission path B by using the second output matching circuit 206 for output. In addition, the control unit 200 controls the first amplification unit 202 to be in an off state (a state of failing to operate). The control unit 200 also controls the switch unit 204 to be in an off state (fail to switch between a plurality of radio frequency transmission paths), so that the radio frequency signal cannot be output by using the radio frequency transmission paths (A1 to An). An uplink and a downlink in TDD_LTE mode are performed on a same frequency band, an operating current is relatively small, and heat generation is not severe. Therefore, radio frequency signals on a B40 frequency band (2300 MHz to 2400 MHz), a B41 frequency band (2496 MHz to 2690 MHz), and a B38 frequency band (2570 MHz to 2620 MHz) in TDD_LTE mode may select to enter the input matching circuit 201 from the radio frequency signal input end R. The first amplification unit 202 is controlled, by using the control unit 200, to enter an operating state. The radio frequency signals enter the first amplification unit 202 by using the input matching circuit 201 for amplification. The amplified radio frequency signals are then transmitted to the switch unit 204 by using the first output matching circuit 203. The control unit 200 controls the switch unit 204 to be in an on (where a switch in the switch unit 204 is disposed at an on position) state, and the control unit 200 controls the second amplification unit 205 to be in an off state (a state of failing to operate). A corresponding radio frequency transmission path is specified from the plurality of radio frequency transmission paths (A1 to An) to output the radio frequency signals. The radio frequency front-end transmission module may select a matched transmission channel according to different frequency bands in different modes, and the control unit controls on and off of corresponding amplification units and the switch unit, to implement output of radio frequency signals of the different frequency bands in the different modes, so as to improve efficiency of the radio frequency front-end transmission module.

Figure 3:
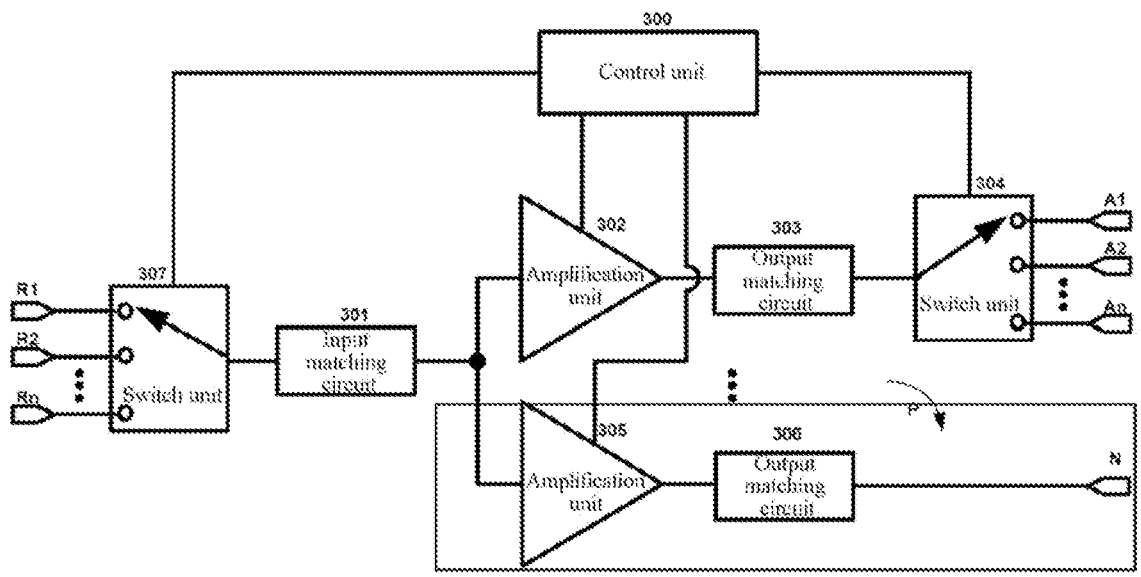
FIG. 3 is a block diagram of a principle of a radio frequency front-end transmission module according to Embodiment 2 of the present invention.

According to another aspect, a radio frequency front-end transmission module is also provided in Embodiment 2 provided in the present invention. As shown in FIG. 3, the radio frequency front-end transmission module includes a first switch unit 304, a second switch unit 307, an input matching circuit 301, a transmission channel P (used for narrowband communication), a transmission channel P' (used for broadband communication), and a control unit 300. The transmission channel P includes a second amplification unit 305 and a second output matching circuit 306. The second amplification unit 305 is connected to a radio frequency transmission path N by using the second output matching circuit 306. The transmission channel P has a radio frequency transmission path that can be optimized to be within a specified narrowband frequency band range. The transmission channel P' includes a first amplification unit 302, a first output matching circuit 303, and the first switch unit 304. The first output matching circuit 303 is disposed between the first amplification unit 302 and a common end of the first switch unit 304. An output end of the first switch unit 304 is connected to a plurality of radio frequency transmission paths (A1 to An). A plurality of radio frequency signal input ends (R1 to Rn) is correspondingly connected to a plurality of input ends of the second switch unit 307. A common end of the second switch unit 307 is connected to input ends of a plurality of amplification units (the amplification units in the transmission channels P and P') by using the input matching circuit 301. The control unit 300 is connected to the first switch unit 304 in the transmission channel P', the second switch unit 307, and the plurality of amplification units (the amplification units in the transmission channels P and P') According to a requirement, the radio frequency front-end transmission module may further include a plurality of transmission channels P. To be specific, the common end of the second switch unit 307 is connected to input ends of amplification units in the plurality of transmission channels P by using the input matching circuit 301, and the plurality of transmission channels P is respectively optimized to be on specified frequency bands. The control unit 300 controls corresponding switch units and amplification units to be in an on or off state, so that one of the amplification units is in an operating state, other amplification units are in a non-operating state, and the other amplification units in the non-operating state present high impedance, thereby not affecting normal operation of the amplification unit in the operating state. That is, one transmission channel of the radio frequency front-end transmission module is in an operating state, other transmission channels are in an off state, and the other transmission channels do not have any impact on the transmission channel in the operating state.

Similarly, the frequency bands within the range of 2300 MHz to 2700 MHz are still used as an example to further describe the radio frequency front-end transmission module provided in Embodiment 2. According to an output requirement of any one of radio frequency signals of a B7 frequency band (2496 MHz to 2570 MHz) in FDD_LTE mode or a B40 frequency band (2300 MHz to 2400 MHz), a B41 frequency band (2496 MHz to 2690 MHz), and a B38 frequency band (2570 MHz to 2620 MHz) of in TDD_LTE mode, the control unit 300 controls the second switch unit 307 to be in an on state, and an input end matching a to-be-input radio frequency signal is selected. Then the input signal is transmitted to a corresponding transmission channel by using the input matching circuit 301 for amplification and output. A specific operating process is the same as that in Embodiment 1, and details are not described herein again. The radio frequency front-end transmission module may also select a matched transmission channel according to different frequency bands in different modes, and the control unit controls on and off of corresponding amplification units and switch units, to implement output of radio frequency signals of the different frequency bands in the different modes, so as to improve efficiency of the radio frequency front-end transmission module. In addition, the radio frequency front-end transmission module may have, according to a specific requirement, a plurality of radio frequency transmission paths (where the radio frequency transmission paths are located in the transmission channel P) separately optimized to be on a narrowband frequency band. The quantity of the radio frequency signal input ends is extended, and arbitrary switching can be performed between the plurality of radio frequency signal input ends by using the switch units, so that the radio frequency front-end transmission module has higher flexibility.

Figure 4:
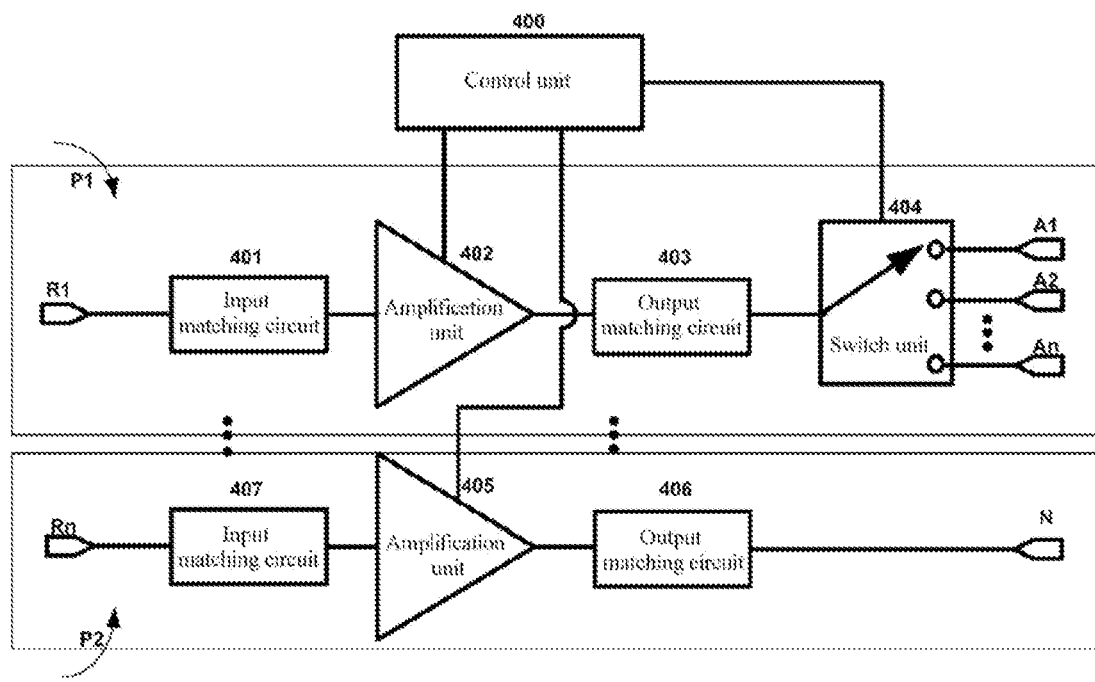
FIG. 4 is a block diagram of a principle of a radio frequency front-end transmission module according to Embodiment 3 of the present invention.

A radio frequency front-end transmission module is also provided in Embodiment 3 provided in the present invention. As shown in FIG. 4, the radio frequency front-end transmission module includes at least one transmission channel P1 (used for broadband communication) and transmission channel P2 (used for narrowband communication). The transmission channel P1 includes a radio frequency signal input end R1, an input matching circuit 401, a first amplification unit 402, a first output matching circuit 403, a switch unit 404, and a plurality of radio frequency transmission paths (A1 to An). The radio frequency signal input end R1 is connected to an input end of the first amplification unit 402 by using the input matching circuit 401. An output end of the first amplification unit 402 is connected to a common end of the switch unit 404 by using the first output matching circuit 403. The switch unit 404 is connected to a plurality of radio frequency transmission paths (A1 to An) The transmission channel P2 includes a radio frequency signal input end Rn, an input matching circuit 407, a second amplification unit 405, a second output matching circuit 406, and a radio frequency transmission path N. The radio frequency signal input end Rn is connected to an input end of the second amplification unit 405 by using the input matching circuit 407. An output end of the second amplification unit 405 is connected to the radio frequency transmission path N. A control unit 400 is connected to an amplification unit and a switch unit in each transmission channel.

In actual application, for frequency bands whose operating frequencies and operating modes do not greatly differ, radio frequency signals of, for example, a B40 frequency band (2300 MHz to 2400 MHz), a B41 frequency band (2496 MHz to 2690 MHz), and a B38 frequency band (2570 MHz to 2620 MHz) in TDD_LTE mode may select transmission channels of a P1 type. The transmission channel P1 has relatively high integration and flexibility. For a frequency band having a relatively high requirement for performance, a radio frequency signal of, for example, a B7 frequency band (2496 MHz to 2570 MHz) in FDD_LTE mode may select a transmission channel of a P2 type. This can reduce consumption of the input radio frequency signal to a maximum extent, and optimize performance of the radio frequency front-end transmission module. An operating process of the radio frequency front-end transmission module is the same as the foregoing description, and details are not described herein again. The radio frequency front-end transmission module may also select a matched transmission channel according to different frequency bands in different modes, and the control unit controls on and off of corresponding amplification units and the switch unit, to implement output of radio frequency signals of the different frequency bands in the different modes, so as to improve efficiency of the radio frequency front-end transmission module.

Figure 5:
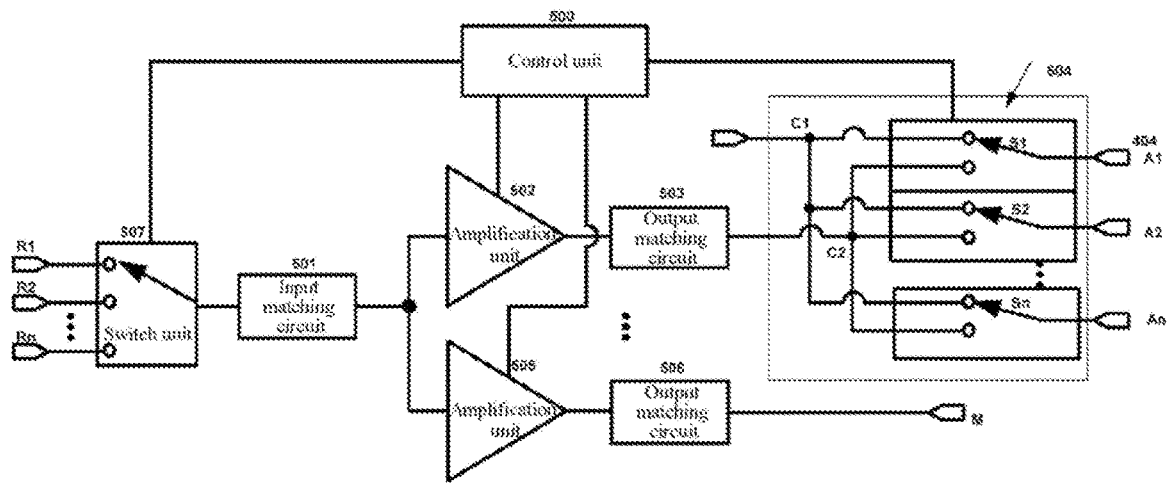
FIG. 5 is a block diagram of a principle of a radio frequency front-end transmission module according to Embodiment 4 of the present invention.

A radio frequency front-end transmission module is also provided in Embodiment 4 provided in the present invention. As shown in FIG. 5, the radio frequency front-end transmission module includes a switch unit 507, an input matching circuit 501, at least two transmission channel P3 and transmission channel P4, and a control unit 500. The transmission channel P3 includes a first amplification unit 502, a first output matching circuit 503, and a switch unit 504. The switch unit 504 includes at least two common ends. The following uses the switch unit 504 provided in FIG. 5 as an example for further description. Two common ends C1 and C2 are disposed in the switch unit 504. The first amplification unit 502 is connected to the common end C2 of the switch unit 504 by using the first output matching circuit 503. The common end C1 of the switch unit 504 is connected to a baseband processor. An output end of the switch unit 504 is connected to a plurality of radio frequency transmission paths (A1 to An) by using a plurality of switches (S1 to Sn). The plurality of radio frequency transmission paths (A1 to An) is connected to an antenna by using a filter module. According to different actual functions, the foregoing radio frequency transmission paths (A1 to An) may also be used as radio frequency receiving paths. When an input radio frequency signal needs to be amplified and be transmitted by using an antenna, the control unit 500 controls the switches (S1 to Sn) in the switch unit 504 to be connected to the common end C2 of the switch unit 504. In this case, after being amplified by the first amplification unit 502, the input radio frequency signal is then transmitted through the first output matching circuit 503 to the radio frequency transmission paths (A1 to An) corresponding to the switch unit 504, and is then transmitted to the antenna through the radio frequency transmission paths (A1 to An) for transmission. When the radio frequency signal is received from the antenna and is transmitted to the baseband processor, the control unit 500 controls the switches (S1 to Sn) in the switch unit 504 to be connected to the common end C1 of the switch unit 504. In this case, the radio frequency signal received from the antenna reaches the common end C1 of the switch unit 504 through the radio frequency transmission paths (A1 to An) and the switches (S1 to Sn) in the switch unit 504, and is further transmitted to the baseband processor for further processing. In this process, the control unit 500 controls all amplification units to be in an off state, and also controls the common end C2 of the switch unit 504 to the plurality of radio frequency transmission paths/radio frequency receiving paths (A1 to An) to be in an off state. That is, all the amplification units and the common end C2 of the switch unit 504 to the plurality of radio frequency transmission paths/radio frequency receiving paths (A1 to An) are enabled to present high impedance. The transmission channel P4 includes a second amplification unit 505, a second output matching circuit 506, and a radio frequency transmission path M. A structure of the transmission channel P4 is the same as that of the transmission channel P in Embodiment 2. Details are not described herein again Connection relationships between the switch unit 507, the input matching circuit 501, at least two transmission channels P3 and transmission channels P4, and the control unit 500 in a structure of the radio frequency front-end transmission module are the same as those of Embodiment 2. Details are not described herein again. The radio frequency front-end transmission module may also select a matched transmission channel according to different frequency bands in different modes, and the control unit controls on and off of corresponding amplification units and the switch unit, to implement output of radio frequency signals of the different frequency bands in the different modes, so as to improve efficiency of the radio frequency front-end transmission module. In addition, for the radio frequency front-end transmission module, the quantity of radio frequency signal input ends is extended, and arbitrary switching can be performed between the plurality of radio frequency signal input ends by using the switch unit, so that the radio frequency front-end transmission module has higher flexibility, and costs of external components are reduced.

Figure 6:
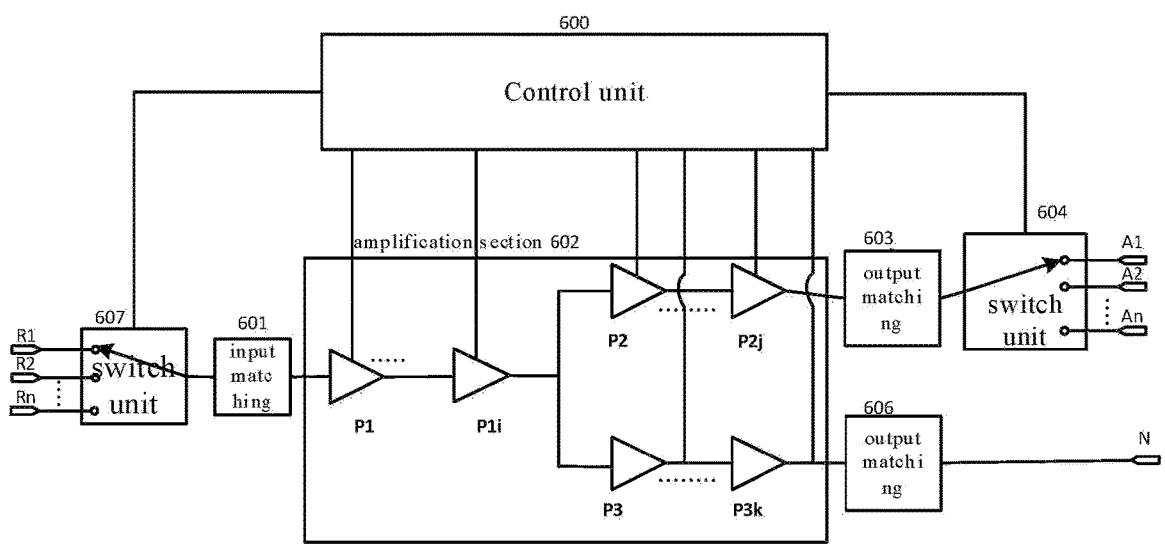
FIG. 6 is a block diagram of a principle of a radio frequency front-end transmission module according to Embodiment 5 of the present invention.

A radio frequency front-end transmission module is provided in embodiment 5 of the present invention. As shown in FIG. 6, the radio frequency front-end transmission module includes a control unit 600, an input matching circuit 601, a switch unit 607, an amplification section 602 comprising a plurality of amplification units, a first output matching circuit 603, a switch unit 604, and a second output matching circuit 606, wherein the control unit 600 is connected to the switch unit 604, the switch unit 607, and the amplification section 602, respectively. P1 . . . P1$i$, P2 . . . P2$j$ and P3 . . . P3$k$ The amplification section 602 includes three groups of amplification units P1 . . . P1$i$, P2 . . . P2$j$, and P3 . . . P3$k$, wherein i, j, and k are positive integers, which can be the same value or different value. Each group of amplification units includes at least one amplification unit inside. When there is a plurality of amplification units within each group of amplification units, these amplification units are cascaded with each other to form a multi-stage amplification unit. In Embodiment 5, one transmission channel comprising the amplification units P2 P2$j$, the first output matching circuit 603, and the switch unit 604 is connected to a plurality of radio frequency transmission paths (A1 to An), respectively. The multiple radio frequency transmission paths (A1 to An) are connected to the antenna via the filter module Depending on the actual function, the radio frequency transmission paths (A1 to An) can also be used as radio frequency receiving paths. In addition, the amplification unit P3 P3$k$ and the second output matching circuit 606 form another transmission channel. The transmission channel can be connected to the corresponding radio frequency transmission path or radio frequency receiving path as required.

The specific mode of operation of Embodiment 5 is similar to that of Embodiment 4, which is not explained in detail herein. The main difference between this example and Embodiment 4 is that the three amplification units P1 . . . P1$i$, P2 . . . P2$j$, and P3 . . . P3$k$ can be flexibly combined and configured. For example, amplification unit P1 . . . P1$i$ can be used for different transmission channels, thus saving the number of amplification units and improving the integration of the radio frequency front-end transmit module. The amplification units P2. P2$j$ and P3 P3$k$ can be individually optimized according to the performance requirements of the radio frequency front-end transmission module, for example, by selecting different numbers of amplification stages (i.e., different values for j and k). In addition, three groups of amplification units P1 . . . P1$i$, P2 . . . P2$j$, and P3 . . . P3$k$ can select different types or parameters of amplification elements respectively, so as to adapt to different modes and different frequency bands of radio frequency signal transmission/reception requirements.

Figure 7:
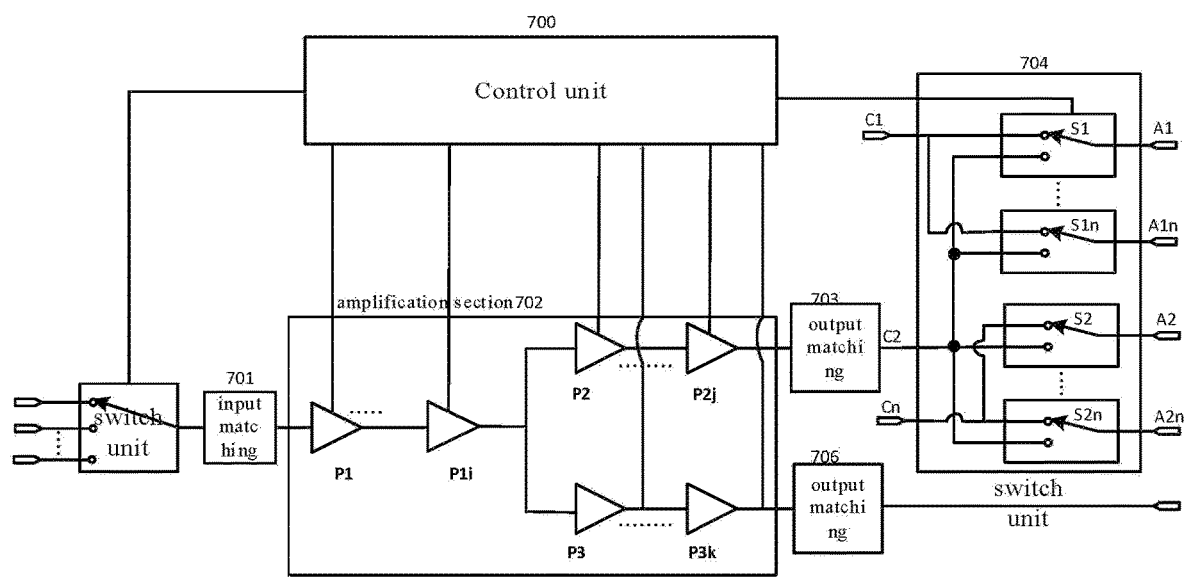
FIG. 7 is a block diagram of a principle of a radio frequency front-end transmission module according to Embodiment 6 of the present invention.

In the embodiment 6 provided by the present invention, a radio frequency front-end transmission module is provided. As shown in FIG. 7, the radio frequency front-end transmission module includes a control unit 700, an input matching circuit 701, a switch unit 707, an amplifier section 702 comprising a plurality of amplification units, a first output matching circuit 703, a switch unit 704, and a second output matching circuit 706, wherein the control unit 700 is connected to the switch unit 704, the switch unit 707, and the amplifier section 702, respectively. The amplification section 702 includes three groups of amplification units P1 . . . P1$i$, P2 . . . P2$j$ and P3 . . . P3$k$ The amplification section 702 includes three groups of amplification units P1 . . . P1$i$, P2 . . . P2$j$, and P3 . . . P3$k$, wherein i, j, and k are positive integers that can be the same value or different value. Each group of amplification units includes at least one amplification unit inside. When there is a plurality of amplification units within each group of amplification units, these amplification units are cascaded with each other. In Embodiment 6, one transmission channel comprising amplification units P2 . . . P2$j$, a first output matching circuit 703, and a switch unit 704 is connected to a plurality of radio frequency transmission paths (A1 to A1$n$, A2 to A2$n$, etc.), respectively. The multiple radio frequency transmission paths (A1 to A1$n$, A2 to A2$n$, etc.) are connected to the antenna through the filter module Depending on the actual function, the radio frequency transmission paths (A1-A1$n$, A2-A2$n$, etc.) can also be used as radio frequency receiving paths. In addition, the amplification unit P3 . . . P3$k$ and the second output matching circuit 706 form another transmission channel. The transmission channel can be connected to the corresponding radio frequency transmission path or radio frequency receiving path as needed.

In Embodiment 6, the amplifier section 702 works in the same manner as the amplifier section 602 in Embodiment 5, and is not described herein. The main difference between Embodiment 6 and Embodiment 5 is that the switch unit 704 adopts a structure similar to the switch unit 504 in Embodiment 4, including at least two common ends. The switch unit 704 provided in FIG. 7 is further illustrated below as an example. The switch unit 704 is provided with a plurality of common ends C1, C2 . . . Cn, where n is a positive integer. The first output matching circuit 703 may select any one of the common ends to be connected. In the embodiment shown in FIG. 7, the selected common end is C2. In addition, the common end C1 or Cn may be selected to be connected to the baseband processor. The output terminals of the switch unit 704 are connected to a plurality of radio frequency transmission paths (A1 to A1$n$, A2 to A2$n$, etc.) via a plurality of switches (S1 to S1$n$, S2 to S2$n$, etc.), respectively. Depending on the actual function, the radio frequency transmission paths (A1 to A1$n$, A2 to A2$n$, etc.) can also be used as radio frequency receiving paths. When the input radio frequency signal needs to be amplified and transmitted through the antenna, the control unit 700 controls the switch (S1~S1$n$, S2~S2$n$, etc.) in the switch unit 704 and the common end C2 of the switch unit 704, at this time, the input radio frequency signal is amplified by the amplifier 702, and then transmitted to the corresponding radio frequency transmitter of the switch unit 704 through the first output matching circuit 703. path (A1 to A1$n$, A2 to A2$n$, etc.), and then transmitted to the antenna for transmission through the radio frequency transmission path (A1 to A1$n$, A2 to A2$n$, etc.). When the radio frequency signal is received from the antenna and transmitted to the baseband processor, the control unit 700 controls the switch in the switch unit 704 (S1~S1n) and the switch unit 704 common end C1 connected, when the radio frequency signal received by the antenna through the radio frequency reception path (A1~A1n) and the switch in the switch unit 704 (S1~S1n) to the common end C1 connected to the switch unit 704 and is transmitted to the baseband processor for further processing. As can be seen from FIG. 7, different common end C1, C2 . . . Cn can be connected with different number of switches, which allows for many different combinations of connections, making the radio frequency front-end transmission module more flexible and saving the costs of external components.

The radio frequency front-end transmission module shown in the foregoing embodiment may be applied to an integrated circuit chip (for example, a wireless transceiver chip). For a structure of the radio frequency front-end transmission module in the integrated circuit chip, details are not described herein again one by one.

The radio frequency front-end transmission module shown in the foregoing embodiment may also be applied to a communications terminal, and serve as an important component of a wireless transceiver circuit. The communications terminal described herein refers to a computer device that can be used in a mobile environment and that supports a plurality of communications standards such as GSM, EDGE, TD_SCDMA, TDD_LTE, and FDD_LTE, and includes, but not limited to, a mobile phone, a notebook computer, a tablet computer, an in-vehicle computer, or the like. In addition, the radio frequency front-end transmission module is also applicable to another occasion to which the wireless transceiver circuit is applied, for example, a communications base station compatible with a plurality of communications standards. Details are not described herein one by one.

The radio frequency front-end transmission module, the chip, and the communications terminal provided in the present invention are described in detail above. Any apparent change made to the present invention by a person of ordinary skill in the art without departing from the essence and spirit of the present invention shall fall within the protection scope of the patent rights of the present invention

What is claimed is:

1. A radio frequency front-end transmission module, comprising a first switch unit, a second switch unit and at least two radio frequency transmission paths, wherein
    an input end of the second switch unit is connected to a plurality of corresponding radio frequency signal input ends, a common end of the second switch unit is connected to input end of a first group of amplification units by using an input matching circuit;
    an output end of the first group amplification units is divided into two ways and is connected to input end of a second group of amplification units and input end of a third group of amplification units respectively;
    the second group of amplification units is connected to a first output matching circuit, the first output matching circuit is connected to the first switch unit and connected to at least one radio frequency transmission path by using the first switch unit;
    the third group of amplification units is connected to a second output matching circuit, and the second output matching circuit is directly connected to another radio frequency transmission path; and
    every group of amplification units consists of one or more stages of amplification units, and two neighboring stages of amplification units are connected by using an inter-stage matching circuit.

2. The radio frequency front-end transmission module according to claim 1, further comprising a control unit, wherein
    the first switch unit, the second switch unit and amplification units are controlled by the control unit.

3. The radio frequency front-end transmission module according to claim 2, wherein
    the control unit controls, according to different requirements of inputting a radio frequency signal, a radio frequency transmission path matching the radio frequency signal to be in an on state, and controls all of remaining radio frequency transmission paths to be in an off state.

4. The radio frequency front-end transmission module according to claim 1, wherein
    the at least one radio frequency transmission path is used for broadband communication, and the another at least one radio frequency transmission path is used for narrowband communication.

5. The radio frequency front-end transmission module according to claim 1, wherein
    the first switch unit comprises a plurality of common ends, and one of the common ends is connected to the first output matching circuit.

6. The radio frequency front-end transmission module according to claim 1, wherein
    an output end of the first switch unit is connected to at least one corresponding radio frequency transmission paths.

7. The radio frequency front-end transmission module according to claim 2, wherein
    the control unit is connected to every amplification unit, and controls the amplification unit to be in an on or off state.

8. The radio frequency front-end transmission module according to claim 2, wherein
    the control unit is connected to the first switch unit and the second switch unit, the first switch unit and the second switch unit are controlled by using the control unit to be in the on or off state, the control unit controls the first switch unit to select a corresponding radio frequency transmission path to transmit a radio frequency signal, and the control unit further controls the second switch unit to select a corresponding radio frequency signal input end to receive the radio frequency signal.

9. An integrated circuit chip, comprising the radio frequency front-end transmission module according to claim 1.

10. A communications terminal, comprising the radio frequency front-end transmission module according to claim 1.

* * * * *